(12) United States Patent
Rovati (10) Patent No.: US 6,675,267 B2
(45) Date of Patent: Jan. 6, 2004

(54) SHARED MEMORY ACCESS BY MULTIPLE CONTROLLERS HAVING DIFFERENT BUS WIDTHS

(75) Inventor: Fabrizio Rovati, Milan (IT)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/972,548

(22) Filed: Oct. 5, 2001

(65) Prior Publication Data

US 2002/0010841 A1 Jan. 24, 2002

Related U.S. Application Data

(63) Continuation of application No. 09/239,161, filed on Jan. 28, 1999, now abandoned.

(30) Foreign Application Priority Data

Jan. 30, 1998 (EP) .............................................. 9802096

(51) Int. Cl.⁷ .............................................. G06F 12/04
(52) U.S. Cl. ...................................... 711/150; 711/155
(58) Field of Search ................................ 711/147, 149, 711/150, 151, 155, 157, 158

(56) References Cited

U.S. PATENT DOCUMENTS

| | | | |
|---|---|---|---|
| 5,193,150 A | 3/1993 | Takeuchi et al. ............ | 709/234 |
| 5,586,289 A | * 12/1996 | Chin et al. .................. | 711/111 |
| 5,594,877 A | 1/1997 | Lentz et al. ................ | 710/126 |
| 5,600,814 A | 2/1997 | Gahan et al. ................ | 711/100 |
| 5,761,731 A | 6/1998 | Van Doren et al. ......... | 711/155 |
| 5,781,918 A | 7/1998 | Lieberman et al. ............ | 711/5 |
| 5,920,894 A | * 7/1999 | Plog et al. .................. | 711/151 |
| 6,128,711 A | 10/2000 | Duncan et al. ............. | 711/155 |

FOREIGN PATENT DOCUMENTS

| | | |
|---|---|---|
| JP | 62-078668 | 4/1987 |
| JP | 1-310463 | 12/1989 |
| JP | 3-185696 | 8/1991 |

OTHER PUBLICATIONS

Microsoft Press, "Computer Dictionary", Second Edition, 1994, p.418.*

* cited by examiner

*Primary Examiner*—Gary Portka
(74) *Attorney, Agent, or Firm*—Lisa K. Jorgenson; Timothy L. Boller; Seed IP Law Group PLLC

(57) ABSTRACT

There is disclosed a method and circuit for allowing access to a shared memory by at least two controllers having different bus widths. Such method and circuit provides particular advantages in its application to controlling access to a shared memory in a digital set-top-box of a digital television receiver.

An arbiter is provided to access between memory accesses by first and second memory access circuitry. The first memory access circuitry accesses a block of data in the shared memory, and the second memory access circuitry accesses two blocks of data in each memory access. Each second memory write access comprises reading blocks of data from first and second memory locations and then writing blocks of data to first and second memory locations.

19 Claims, 5 Drawing Sheets

SHARED MEMORY ACCESS BY MULTIPLE CONTROLLERS HAVING DIFFERENT BUS WIDTHS

CROSS-REFERENCE TO RELATED APPLICATION

This application is a continuation of U.S. patent application Ser. No. 09/239,161, filed Jan. 28, 1999, now abandoned, which application is incorporated herein by reference in its entirety.

BACKGROUND OF THE INVENTION

1. Field of the Invention

The present invention relates to access of a shared memory by at least two controllers having different bus widths. The invention relates particularly but not exclusively to access of such a shared memory in a digital set-top-box of a digital television receiver.

2. Description of the Related Art

In digital television systems, a television is provided with a set-top-box to receive and decode a broadcast digital data stream which contains programme information for display on the television. The broadcast digital data stream may arrive at the set-top-box via a satellite or cable system, via a digital terrestrial system, or via a disk or tape. A disk or tape, such as a CD ROM drive in a personal computer, may provide digital video information for display on a monitor.

There are various known standards for digital video broadcasting (DVB) and one now commonly used standard is the MPEG-2 standard.

In the MPEG-2 DVB standard data is encoded into transport packets. Each transport packet is defined by the standard as consisting of 188 bytes, comprising 4 header bytes and 184 payload bytes ("the data payload"). For transmission, the transport packets are time division multiplexed into a transport stream. At the receiver in the set-top-box, the transport stream is demultiplexed to recover the transport packets. Optionally the transport packets may be scrambled and encoded with error correction information for transmission, and then descrambled and error-checked at the receiver.

The data payload in the transport packets is, according to the MPEG-2 standard, one of two types. The first type is known as a packetised elementary stream (PES), and the second type is known as program specific information (PSI).

The packetised elementary streams (PESs) form the video, audio and private data information of the broadcast. A PES packet may contain all sorts of data, audio or video, and also other information such as teletext or other user-defined general data. The MPEG-2 transport stream is made up of one or more PESs (either video, audio or private). The MPEG-2 transport stream is primarily intended for the transport of TV programmes over long distances. This type of stream can combine, in the same multiplex, many programmes each of them being composed of one or more PESs. In order that the receiver can cope with this mix of programme information, the MPEG-2 standard defines four types of tables, which together make up the MPEG-2 program specific information (PSI).

At each decoder or set-top-box, the transport stream is decoded. To achieve the decoding of the transport stream, each set-top-box is provided with a transport interface, which provides an interface between the transport stream input to the box and the actual MPEG-2 decoders which decode the audio and video information and sections broadcasts.

The transport interface demultiplexes the transport stream to retain only those transport packets which are required by the particular set-top-box for decoding. The transport stream is a set of different services time division multiplexed, and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set-top-box is only interested in receiving packets having packet identifiers of interest to the particular set-top-box, for instance those associated with a particular television programme selected for viewing. Thus once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets, but then filters the sections of the demultiplexed packets to retain only sections required by the receiver, before storing the filtered sections in the memory without any further processing.

Although the MPEG-2 DVB standard is one of the main digital video broadcast standards, there are variations within the standard. It is desirable to provide receivers having decoders which are generally as flexible as possible not only to cope with variations in the standard but, if necessary, to enable the receiver to be used with a different standard.

It is therefore generally desirable to provide a single receiver which provides the flexibility of enabling different types of digital video broadcast standards to be used by utilising a programmable transport interface. Utilising such a receiver in a set-top-box may enable the set-top-box to be switched between two or more types of syntax format associated with different standards in situ.

Such a programmable transport interface requires a transport processor to be provided in addition to a main processor of the receiver in the set-top-box. Flexibility in the programmable transport interface is provided by a transport memory the contents of which can be altered under the control of the main processor during configuration, and which can be accessed by the transport processor and main processor during normal operation.

Where there is a requirement for such shared memory access, it is quite common for the wordlengths or bus widths of the two processors to be different. In such cases the memory wordlength or bus access width will be compatible with one of the processor wordlengths, but not the other.

In a programmable transport interface for use in a digital-set-top box, it is usual for the transport controller, which is required to perform less complex processing operations, to have a smaller wordlength than that of the main processor. The memory is chosen to have a wordlength directly compatible with the transport controller, since the transport controller performs the majority of memory accesses to the memory.

There is therefore a need for arbitration between the two processors to overcome problems caused by the different wordlength access. The most common problem arises because the processor having the longer wordlength must always access the memory in its own wordlength. Therefore if such processor has a wordlength of twice that of the memory, it will always read or write two memory words even if a single memory word access is required. It is therefore a problem that, without proper arbitration, such processor may corrupt an adjacent memory word or make it invalid whilst writing a valid memory word.

BRIEF SUMMARY OF THE INVENTION

It is therefore an object of the present invention to provide a simple arbitration scheme for access to a shared memory by at least two control circuits having different wordlengths which does not unduly complicate the circuitry associated with the memory.

The present invention thus provides a method of controlling first and second memory accesses to a shared memory arranged to store blocks of data, comprising the steps of arbitrating between first and second memory accesses, accessing a block of data responsive to each first memory access, accessing two blocks of data responsive to each second memory access, wherein each second memory write access comprises reading blocks of data from first and second memory locations and writing blocks of data to first and second memory locations.

The invention also provides circuitry for accessing a memory in which data is stored as blocks, comprising arbitration circuitry for controlling access to the memory, first memory access circuitry connected to the arbitration circuitry for accessing a stored data block, second memory access circuitry connected to the arbitration circuitry for accessing two stored data blocks, wherein on a write access the second memory access circuitry reads data blocks from first and second memory locations and writes two data blocks, to the first and second memory locations.

The invention will now be described with reference to the accompanying drawings.

DETAILED DESCRIPTION OF THE INVENTION

In the following description the present invention is described with reference to an exemplary embodiment in which an MPEG-2 transport stream is demultiplexed in a programmable transport interface of a receiver in a digital set-top-box. It will be apparent, however, that the present invention is not limited to such an application and does in fact have broader applicability to other types of digital data and other types of application.

Figure 1:
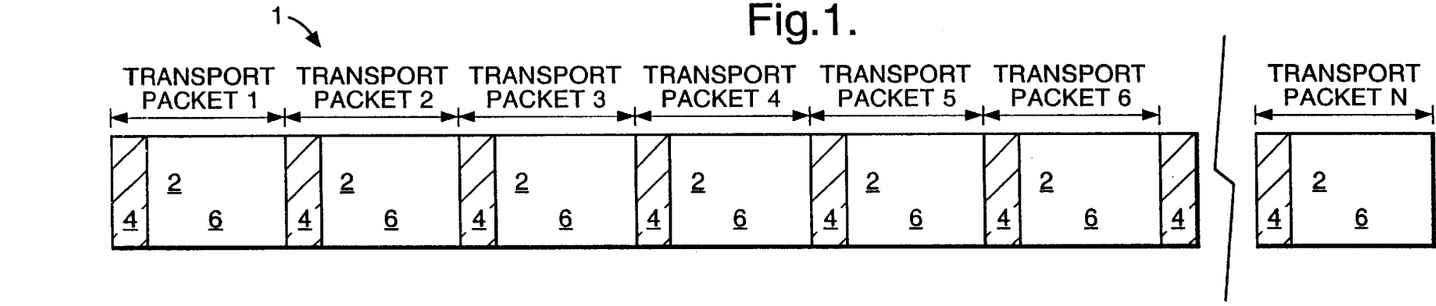
FIG. 1 illustrates a portion of a transport stream.

FIG. 1 illustrates a portion of a transport stream 1 which is composed of a series of N transport packets 2. Each transport packet 2 comprises a transport packet header 4 and a transport packet payload 6. The transport stream is a bit stream which carries in the transport packet payloads 6 information for recreating, for example, a number of different television programmes. The transport stream is formed by source encoding the television programmes. The transport stream is then typically channel encoded for transmission (by satellite or cable) and channel decoded on its reception to reproduce the transport stream. The transport stream is then source decoded to recreate a selected one of the different television programmes. Each particular television programme requires three types of information (audio information, video information and tables of programme information) for its recreation. Each transport packet 2 is preferably associated with a particular television programme, a particular source encoding time and a particular one of the information types. The individual transport packets are time division multiplexed to form the transport stream and allow the real-time recreation of any one of the different television programmes from the transport stream. To recreate a television programme the transport stream is sequentially demultiplexed to recover only the transport payloads 6 of audio information, video information and tables of programme information which are associated with the selected television programme. The recovered payloads are then decoded and used to recreate the television programme.

According to the MPEG-2 digital video broadcast (DVB) standard each of the transport packets 2 is 188 bytes long and the transport packet header 4 is 4 bytes long. The transport packet payload 6 contains either audio or video information or sections. The sections are parts of tables. The audio and video information and the sections in the payloads 6 are packetised and encoded in accordance with the MPEG-2 DVB compression standard.

Figure 2:
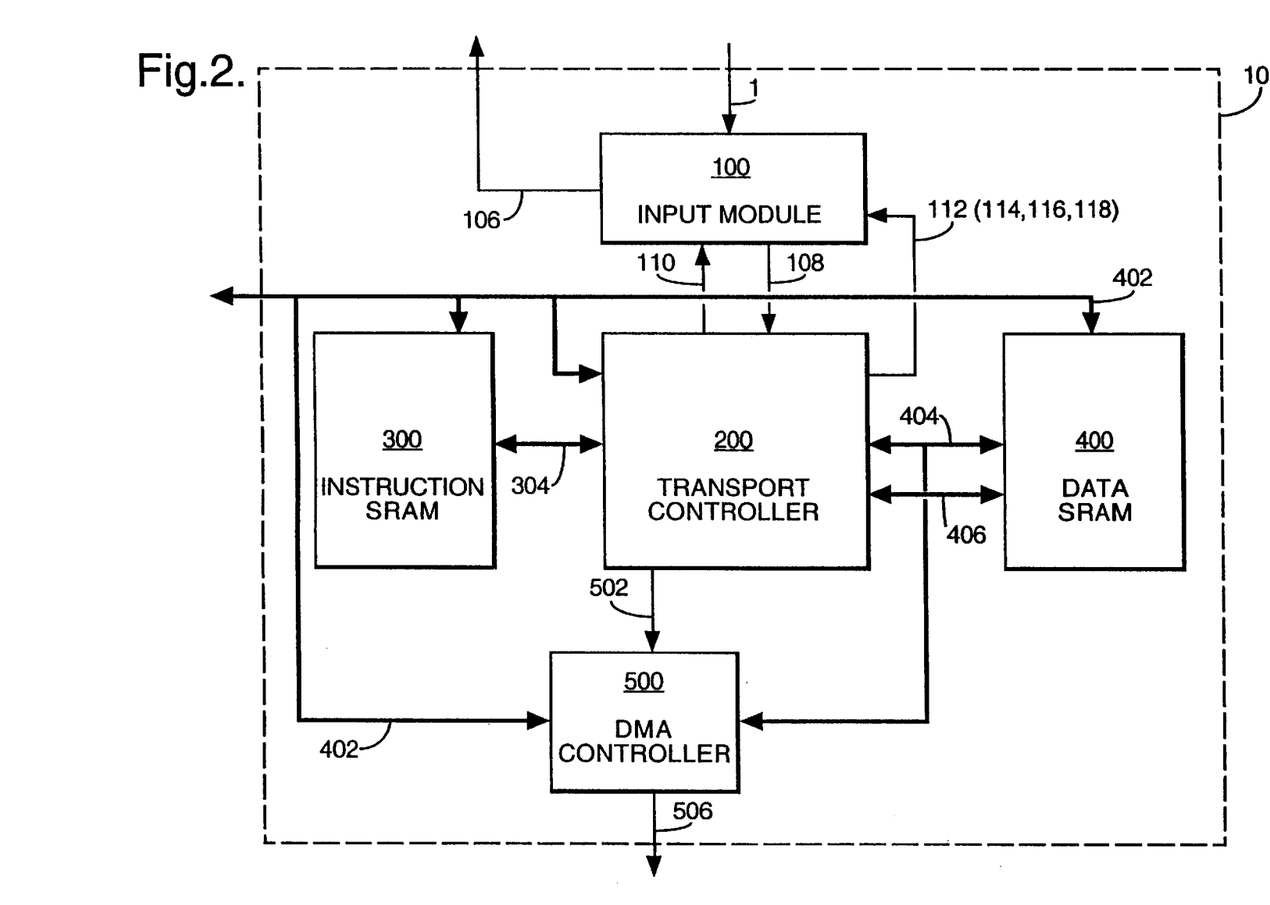
FIG. 2 illustrates in block schematic form a programmable transport interface.

A programmable transport interface 10, illustrated in FIG. 2, is used to process a transport stream 1 and produce a data output stream 506 suitable for reconstitution as a television programme after MPEG-2 decoding by MPEG-2 decoders (not shown). The programmable transport interface 10 is included in a receiver which receives the transport stream 1.

The transport packet header 4 contains a synchronisation byte which identifies the beginning of each transport packet 2. The transport packet header also contains a packet identifier (PID) which identifies the information type and the television programme associated with the transport packet payload 6. The transport packet 2 also contains information identifying the source encoding time of the transport packet. The transport packet header 4, including the synchronisation byte and the PID, is not scrambled. The transport packet payload 6 may be scrambled.

The programmable transport interface (PTI) 10 performs various functions including:
  i) using the synchronisation byte to identify the start of a transport packet 2;
  ii) using the packet identification (PID) to identify, amongst other functions, the type of information contained in the packet (i.e. audio or video information or sections) and the television programme it represents;
  iii) descrambling the transport packet payloads 6; and
  iv) demultiplexing the transport stream 1 to produce a data output stream 506.

The data output stream 506 comprises a stream of audio information associated with the selected television programme, a stream of video information associated with the selected television programme, or tables of programme information associated with the selected television programme. The PTI outputs these streams to the necessary MPEG-2 decoders to reproduce the selected television programme.

The programmable transport interface 10 comprises five primary functional blocks: an input module 100; a transport controller 200; an instruction SRAM (static RAM) 300; a data SRAM (static RAM) 400; and a multi-channel DMA (direct memory access) controller 500.

The input module 100 receives the transport stream 1, and outputs an alternative output stream 106. The input module 100 identifies the synchronisation byte of each transport packet which is used to synchronise the system clock and the transport stream. The input module 100 is controlled by the transport controller 200 via an input module control signal 112 which includes a descrambling control signal 114, an alternative stream control signal 116 and output stream control signals 118. The input module 100 provides bits to the transport controller 200 via an interconnect 108 and it receives bits back from the transport controller 200 via the interconnect 110. The input module, under the control of the transport controller 200 via the input module control signal 112, descrambles the payload 6 of selected transport packets 2 and supplies the selected descrambled payloads to the transport controller 200 via the interconnect 108. The descrambling of the payloads is controlled by the descrambling control signal 114 supplied by the transport controller 200 and the number and rate of bits supplied on the interconnect 108 is controlled by the output stream control signal 118. The input module 100 receives, along the interconnect 110, bits from the transport controller 200 which may be output as the alternative output stream 106 under the control of the alternative stream control signal 116.

The transport controller 200 operates on the bits received on interconnect 108 from the input module 100. The transport controller 200 receives from the input module 100 via interconnect 108 the transport packet header 4 of the transport packet 2 arriving at the transport stream input interface 102. The transport controller 200 uses the packet identifier (PID) in the transport packet header 4 to determine whether the transport packet 2 now entering the input module 100 is associated with a selected television programme for the programmable transport interface 10. If it is not, the received transport packet 2 is discarded. If it is, it controls the input module 100 to descramble (if necessary) the transport packet payload (as described above), and to supply the transport packet payload 6 via the interconnect 108 to the transport controller 200. The transport controller 200 may pass a payload 6 associated with audio or video information for the selected programme straight to the transport controller output 502. If the payload 6 relates to a section of a table the transport controller 200 may further process the information before providing it at its output 502. Alternatively the transport controller 200 may process the received payloads 6 and repacketise them in accordance with a different transmission standard. The reformatted transport stream is then provided to the input module 100 via the interconnect 110 and it is output as the alternative output stream 106 under the control of the alternative stream control signal 116.

The transport controller 200 comprises a transport processor (not shown) which reads instruction sets from the instruction SRAM 300. The transport controller 200 is connected to the SRAM 300 by interconnect 304 and it reads its instructions via the interconnect 304. A system processor (not shown) may read and write to the instruction SRAM 300 via a system interconnect bus 402. However, the transport controller 200 has preferential access to the instruction SRAM 300 determined by an arbiter (not shown) which arbitrates between accesses by the transport controller 200 and the system processor. The system processor may also access the transport controller 200 via the system interconnect bus 402.

The data SRAM 400 can be accessed by the processor of the transport controller 200 via the interconnections 404 and 406. The processor of the transport controller uses the interconnection 404 to read from and write to the data SRAM 400. A search engine within the transport controller 200 reads from the data SRAM 400 along interconnection 406. The search engine searches the data SRAM 400 for the packet identifiers (PID) in the incoming transport packet header 4. If the packet is not to be discarded, then the PID for that packet will have been stored in the data SRAM, and is located by the search engine of the transport controller. Associated with each PID in the data SRAM is a plurality of pointers, which point to other addresses in the data SRAM where other information associated with the incoming transport packet is stored. The search engine retrieves the pointers stored with a particular PID for use by the transport controller processor. The transport controller processor then uses the pointers to access all the information it needs to process the payload of the incoming transport packet. The pointers may, for example: point to descrambling keys for use by the input module 100; point to addresses for use by the DMA controller 500; identify whether the payload is video or audio information or sections, identify whether the payload is special data to be output on alternative output stream 106; or locate information for masking the search filter etc. A detailed description of the operation of the search engine of the transport controller 200 in reading the data SRAM is given in co-pending application Ser. No. 09/239,907, filed Jan. 29, 1999, currently pending.

Thus, this information enables the transport controller to generate the input module control signals 112 as appropriate, and control the processing, if any, of the bits received on interconnect 108.

The transport controller 200 produces a transport controller output 502 which is supplied to the multi-channel DMA controller 500. The multi-channel DMA controller 500 supplies the data output stream 506, indirectly, to the MPEG-2 decoders (not shown). A full description of the DMA controller 500 can be found in co-pending application Ser. No. 09/240,176, filed Jan. 29, 1999, currently pending.

The system processor writes to each of the instruction SRAM 300, the transport controller 200 and the data SRAM 400 via the system interconnect bus 402. The instruction SRAM 300 can only be written to by the system processor: the transport controller can only read from, and not write to, its own instruction SRAM 300 via the interface 304. The system processor can also read from the instruction SRAM. An arbiter is provided to arbitrate between accesses to the instructions SRAM 300 by both the system processor and the transport controller 200.

The system processor, via the system interconnect bus 402, and the transport controller 200 via interface bus 404, can both read and write to the data SRAM 400. The search engine of the transport controller 200 can only read from the data SRAM 400 via interface bus 406. An arbiter is provided to arbitrate accesses to the data SRAM 400 by each of the system processor, the transport controller 200, and the search engine within the transport controller 200. Access to the data SRAM 400 is arbitrated with the following order of priority: the search engine within the transport controller 200 has highest priority, the transport controller processor next priority, and the system processor lowest priority. The transport controller may be reset by the system processor by a reset signal on the interface bus 302.

The system processor, via system interconnect bus 402, and the transport controller 200 via the bus 404, can both read and write to registers within the DMA controller 500. An arbiter is provided to arbitrate between the system processor and transport controller access to the DMA controller.

The system processor via system interconnect bus 402 also accesses registers within the transport controller 200, to read and write thereto.

The system processor initially writes to the instruction SRAM 300, the data SRAM 400, and registers within the transport controller 200 and the DMA controller 500, to configure them.

As can be seen in FIG. 2, the data SRAM 400 is accessed by three different buses, namely the system interconnect bus 402, and the interconnection buses 404 and 406 from the transport controller 200. The bus 404 is the transport controller interconnect bus, whilst the bus 406 is a specific bus generated by a search engine within the transport controller 200 for communication to the data SRAM 400.

It will be appreciated that since the data SRAM 400 is accessed by three different buses, there is a requirement for some arbitration to be provided to arbitrate between accesses to the data SRAM 400. Although not shown in FIG. 2, an arbiter will be provided at the input to the control circuitry of the data SRAM 400 to arbitrate between accesses from each of the buses 402, 404 and 406. In the preferred embodiment, the arbiter contained within the data SRAM 400 is set up such that the search engine of the transport controller 200 has highest priority for accessing the data SRAM 400 via bus 406. The transport controller 200 itself has second highest priority via bus 404 for accessing the data SRAM 400, and the system processor has lowest priority via system interconnect bus 402 for accessing the data SRAM 400. In the event of both the transport controller 200 and the search engine contained within the transport controller 200 requesting access to the data SRAM 400 in the same memory cycle, both requests would be granted. However, the search engines access will succeed whilst the transport controller's address and associated control signals would be ignored.

In the preferred embodiment of the programmable transport interface 10, the system interconnect bus 402 has a data wordlength of 32 bits such that the bus 402 is 32 bits wide, whilst the buses 404 and 406 generated from within the transport controller 200 have data wordlengths of 16 bits such that the buses 404 and 406 are 16 bits wide. Furthermore, in the preferred embodiment of the present invention the data SRAM 400 stores data as 16 bit words and has a 16 bit wide access bus. Thus, the arbiter contained within the data SRAM 400 must, in accordance with the present invention, also provide means for enabling two buses with different wordlengths to interface with a shared memory.

Figure 3:
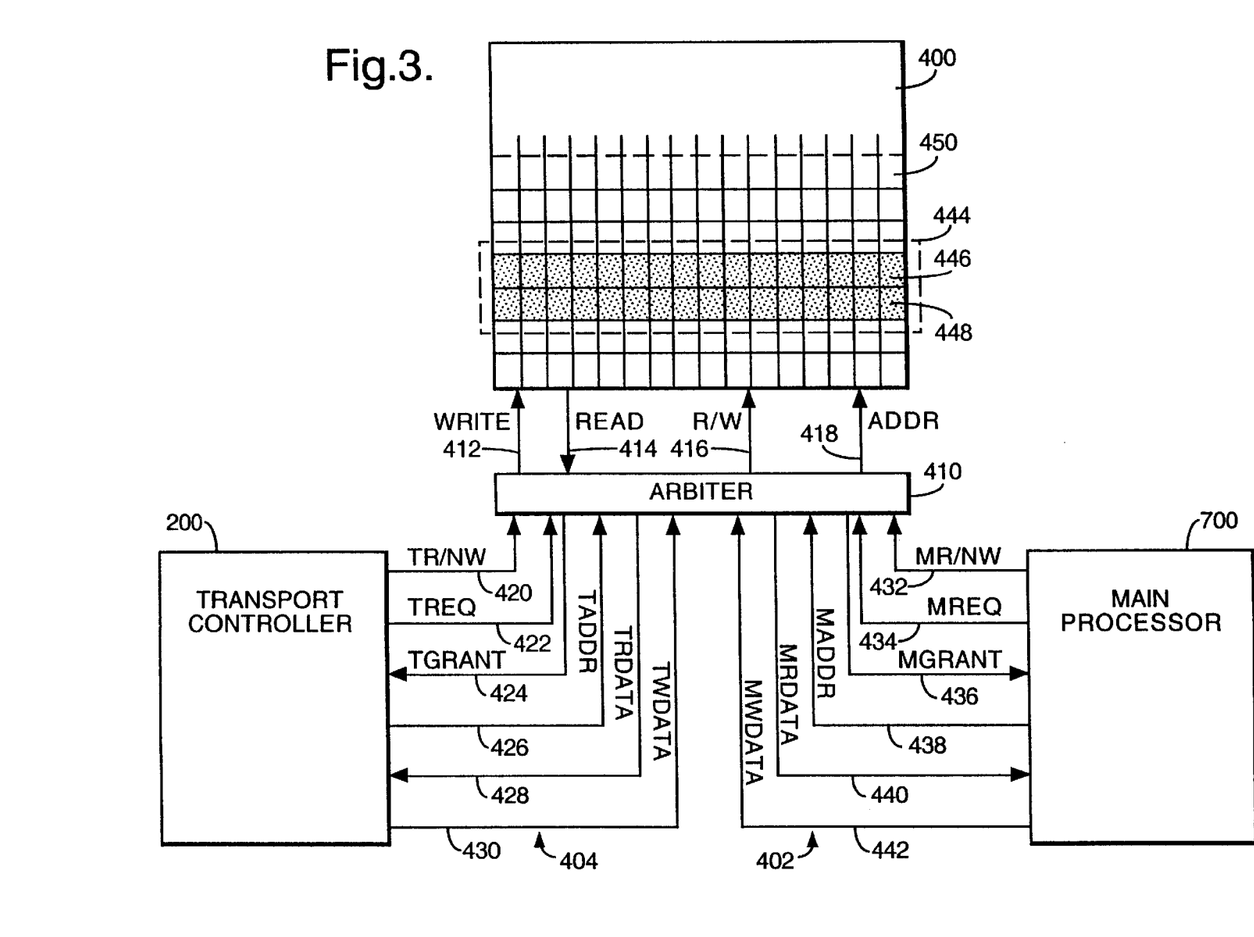
FIG. 3 illustrates in block diagram form two processors of different wordlengths accessing a shared memory.

Referring now to FIG. 3, there is shown in some more detail the data SRAM 400 of FIG. 2. As can be seen in FIG. 3, there is shown arbitration circuitry formed by the arbiter 410 for arbitrating accesses to the data SRAM 400. In the example shown in FIG. 3, the interconnect bus 406 connecting the search engine and the transport controller 200 to the data SRAM 400 is not shown for ease of explaining the present invention. The present invention can be adequately explained by reference only to accesses to the data SRAM 400 via the system interconnect bus 402 and the transport controller bus 404. FIG. 3 additionally shows the transport controller 200, and a main processor generally designated by block 700.

As shown in FIG. 3, the transport controller interconnect bus 404 comprises a transport controller read/not write signal TR/NW on line 420 which is output from the transport controller 200 to the arbiter 410. A transport controller request signal TREQ on line 422 which is output from the transport controller 200 to the arbiter 410, a transport controller grant signal TGRANT on line 424 which is input to the transport controller 200 from the arbiter 410, a transport controller address signal which is output from the output controller 200 to the arbiter 410 via the transport address bus TADDR 426, a transport controller write data bus TWDATA 430 which is output from the transport controller 200 to the arbiter 410, and a transport controller read data bus TRDATA 428 which is output from the arbiter 410 to the transport controller 200.

The main processor interconnect bus 402 comprises a main processor read/not write signal MR/NW on line 432 which is output from the main processor 700 to the arbiter 410, a main processor request signal MREQ on line 434 which is output from the main processor 700 to the arbiter 410, a main processor grant signal MGRANT on line 436 which is input to the main processor 700 from the arbiter 410, a main processor address bus MADDR 438 which is output from the main processor 700 to the arbiter 410, a main processor write data base MWDATA 442 which is output from the main processor 700 to the arbiter 410, and a main processor read data bus MRDATA 440 which is input to the main processor 700 from the arbiter 410.

The arbiter 410 itself generates write data signals WRITE on line 412 to the data SRAM 400 and receives read data signals READ on line 414 from the data SRAM 400. A read/write signal R/W on line 416 is provided from the arbiter 410 to the data SRAM 400, and the arbiter provides address signals on an address bus ADDR 418 to the data SRAM 400.

The data SRAM 400 is configured, in the preferred embodiment of the present invention, as 1536 16 bit wide words. FIG. 3 illustrates these 16 bit wide words configured in a vertical arrangement, although the actual arrangements of words in the data SRAM 400 is not important to the present invention. Thus, the data SRAM 400, comprises a plurality of 16 bit words 450. As shown in FIG. 3, for access by the 32 bit wide main processor 700, the data SRAM 400 can be conveniently considered to comprise pairs of 16 bit words. Thus, numeral 444 generally designates a pair of 16 bit words 446 and 448 which are grouped together for access by the main processor 700.

It will be understood that because the main processor 700 is internally structured as a 32 bit word structure, then it always accesses two words in the data SRAM 400 on either a read or write access cycle, since the data SRAM 400 has a 16 bit word structure. Thus, it is necessary to ensure that when the main processor 700 in fact only wants to change the contents of a 16 bit word in the data SRAM 400, it does not write over the contents of the other 16 bit word in the data SRAM 400 which it also writes to. Thus, referring to FIG. 3, if the main processor 700 writes to the memory word location 448, it will also write to the memory word location 446. If the main processor 700 only intends to alter the contents of the memory word 448, then it is possible that the contents of the memory word 446 will be written over with improper data. Thus, to prevent such problems arising, on each memory write access by the main processor 700 the main processor 700 must first read the contents of the memory location to which it intends to write. If the main processor 700 is then only changing the contents of one word of the memory, the contents of the other word read out from the memory are rewritten back to the memory.

When the transport controller wishes to perform an access to the memory 400 (either read or write), the transport controller request signal TREQ on line 422 is set. If the memory access is a read memory access, the transport controller read/not write signal TR/NW is asserted high, and the appropriate address set on TADDR. The arbiter 410 senses this request and performs the appropriate read access to the memory 400 by setting the signal R/W on line 416 and the address ADDR on lines 418. The data read READ from the memory 400 on lines 414 is output by the arbiter 410 on the transport controller read data bus TRDATA. The TRDATA bus is valid when the transport controller grant signal TGRANT on line 424 is set.

If the transport controller memory is a write memory access, the transport controller read/not write signal TR/NW is asserted low, the appropriate address set on TADDR, and the appropriate data set on TWDATA. The arbiter 410 senses this request and performs the appropriate write access to the memory 400 by setting the signal R/W on line 416, the address ADDR on lines 418, and the write data WRITE on lines 412. When the write access is completed, the arbiter sets the signal TGRANT.

When the main processor wishes to perform an access to the memory 400 (either read or write), the main processor request signal MREQ on line 434 is set. If the memory access is a read memory accesses, the main processor read/not write signal MR/NW is asserted high, and the appropriate address set on MADDR. The arbiter 410 senses this request and performs the appropriate read access to the memory 400 by setting the signal R/W on line 416 and the address ADDR on lines 418. The arbiter 410 breaks memory accesses by the main processor 700 into two single memory accesses to the memory 400. Thus the arbiter reads data from the memory location identified by the address on the bus MADDR and then in a next cycle the data from the next successive memory location or the memory location associated with the addressed memory location.

The thus read two data words are placed on the main processor data bus MRDATA 440 and returned to the main processor 700 by the arbiter 410 setting the grant signal MGRANT on line 436.

If the main processor memory access is a write memory access, the main processor first performs a read access as described hereinabove. Thus, for example, the main processor 700 may wish to write to the memory location 446 of FIG. 3. In such event, the main processor outputs the memory address of the location 446 on the address bus MADDR on line 438. By doing such, the arbiter 410, which has "grouped" locations 446 and 448 together, accesses the contents of both memory locations 448 and 446.

If the main processor 700 is changing the contents of only the location 446, then it will write onto the main processor data bus MWDATA 442 the new 16 bit word to be written into the location 446, and the 16 bit word just read from the memory location 448. The main processor 700 will assert a write request on signal MR/NW and in response to the main processor request MREQ signal on line 434 will output the address of location 446 on address bus MADDR 438. Thus, the memory location 446 is altered without overwriting and corrupting the memory location 448, which has its previous contents rewritten thereto. After such write access, which is performed in two memory cycles of the arbiter, the signal MGRANT is set to indicate completion of the cycle.

As mentioned hereinabove, in the implementation of the present invention in the preferable embodiment in a programmable transport interface, the transport controller 200 has priority over the main processor 700 for accessing the data SRAM 400. However, in general application of the present invention where two memory access circuits having different data wordlengths access a shared memory, the arbiter 410 may provide any preferable type of arbitration between the two devices. For instance, the arbiter 410 may merely grant access to the first one of the transport controller 200 or main processor 700 which request access to the data SRAM 400.

However, a further problem may arise where the transport controller 200 attempts to write to the data SRAM 400 between the read and write operations of a main processor 700 write operation.

Figure 4:
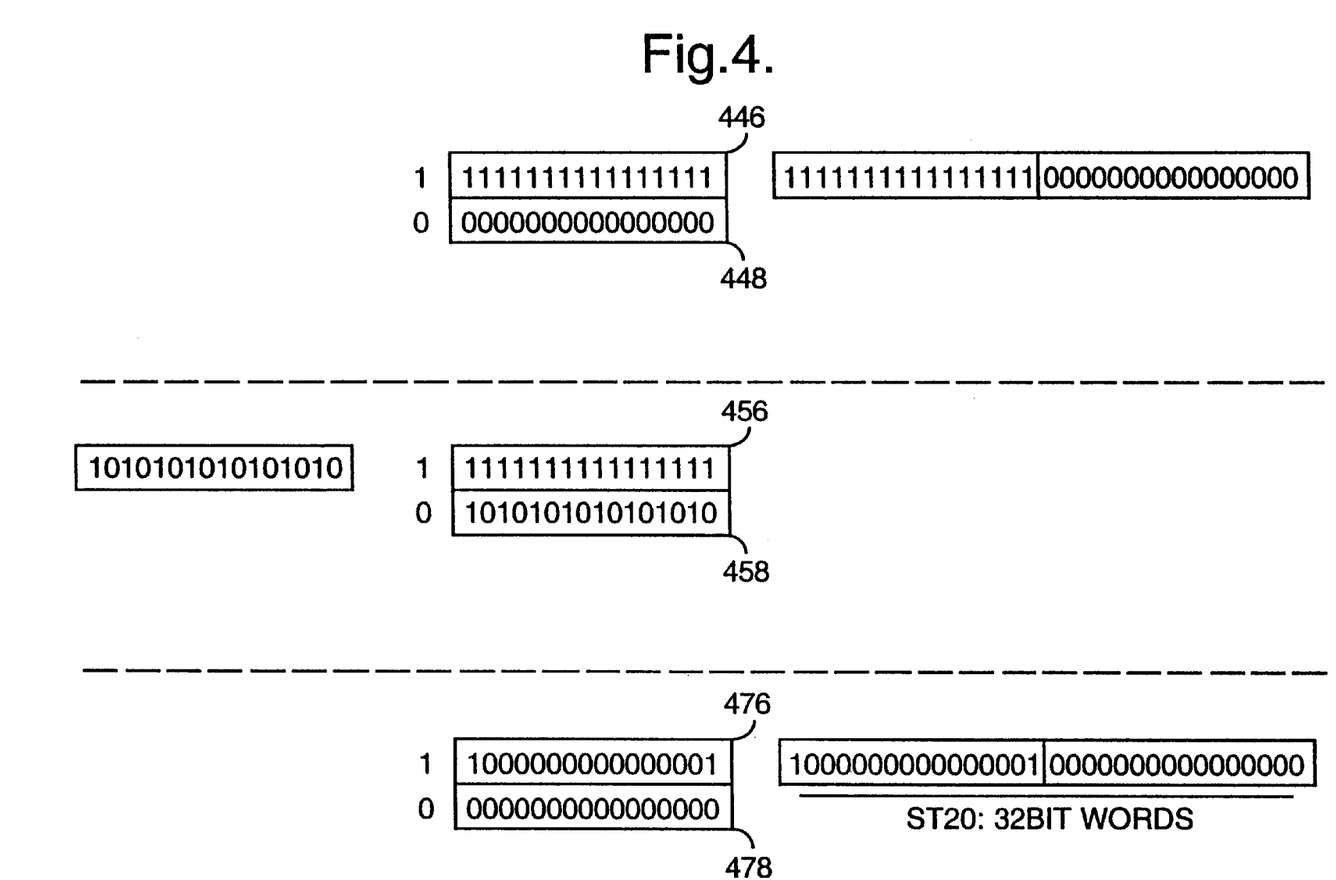
FIG. 4 illustrates schematically a typical problem which may arise in shared memory arrangements such as that of FIG. 3.

Referring now to FIG. 4, there is shown the memory locations 446 and 448 of the data SRAM 400. The location 448 initially stores 16 zeros and the location 446 initially stores 16 ones. The main processor 700 requests access to the data SRAM through the arbiter 410, and the arbiter 410 grants such request. The main processor 700 is requesting access to the data SRAM 400 to perform a write operation, and as discussed hereinabove the first part of a write operation by the main processor 700 involves reading the contents of the two words stored in the data SRAM 400 at the location to which the main processor wishes to write. In the present example, the main processor 700 wishes to write to the memory location 444 including the locations 446 and 448. Thus the main processor 700 reads a 32 bit data word having 16 ones and 16 zeros accessed from the memory locations 446 and 448.

Following such memory read by the main processor 700, the transport controller 200 requests a memory write access to the data SRAM 400. As the main processor 700 has finished the read part of its write cycle, the arbiter 410 grants such request to the transport controller 200. The transport controller 200 wishes to write into the location 446 an alternating 16 bit pattern of ones and zeros. Such write operation is successfully completed by the transport controller 200.

Thereafter, the main processor 700 requests through the arbiter 410 a write access to the data SRAM 400 to complete the write operation previously begun. The main processor 700 wishes to change the contents of the location 446 only, and therefore writes into the location 446 a 16 bit pattern having a one at its least and most significant bits but otherwise zeros, and the contents of the location 448 previously read out, being a 16 bit word of all zeros. In doing so, the main processor 700 writes over the contents of memory location 448 just written to by the transport controller 200, and thus the data word written to the data SRAM by the transport controller 200 is lost.

The problem described hereinabove with reference to FIG. 4 can be overcome by allowing only one processor permission to write to any given two word memory block. If only one processor has permission to write to any given two word memory block, such as block 444 in FIG. 3, there is never any data loss since one processor can never overwrite data assigned to another processor. The allocation of this write permission may be done in a number of ways, for example in hardware or software, dynamically during operation, or statically during configuration.

A hardware implementation could be achieved with circuitry to sense the address of each request of each processor and raise an interrupt when a processor is attempting to write to a word it does not "own". A software implementation could be achieved by assigning memory locations to specific processors.

The method of assigning locations to a given processor can be done in different ways. The simplest is to assign at the beginning a partition of memory for each processor, which allows very simple hardware or software implementations. Alternatively, the assignment could be achieved dynamically as discussed hereinafter.

Although it would be possible to provide some means of ensuring that there is a delay between write access by the transport controller 200 to the data SRAM 400 following any memory request by the main processor 700, a particular advantage is achieved by providing means for overcoming the problem described with reference to FIG. 4 in the arbiter 410 by dynamically allocating memory blocks to each processor. Thus, the arbiter 410 prevents any write access from the transport controller 200 whilst the main processor 700 is performing a write access. Thus during the write access by the main processor 700, the transport controller 200 can only read the contents of the data SRAM 400.

A similar problem arises because the main processor 700 will, on even a read access, still read two 16 bit locations of the data SRAM 400. Thus the transport controller 200 may, in a first memory write access, access the location 448, and in a second successive memory write operation access the memory location 446. However in between the first and second memory write accesses of the transport controller 200, the main processor 700 may write to the general memory location 444 and alter the contents of both locations 448 and 446. It is thus important also that the transport controller 200 preferably writes to both words 448 and 446 in successive write operations without losing control of the data SRAM 400.

Thus the arbiter 410 will, if the transport controller 200 performs a write access to the memory location 448, wait for a fixed predetermined period thereafter to see whether the transport controller 200 requests a memory write access to the location 446 before allowing the main processor 700 to access the memory location 444. Similarly, if the transport controller 200 writes to the memory location 446, it may wait for a predetermined time period to see if the next write operation of the transport controller 200 writes to the memory location 448 before allowing access by the main processor 700 to the general memory area 444.

Thus, some hardware may be provided to sense when a read-writeback cycle is being executed by the system processor, and stall a transport write access to the same location in the meantime.

In summary there are four different implementations for overcoming the problems of FIG. 4:

software implementation and static allocation
software implementation and dynamic allocation
hardware implementation and static allocation
hardware implementation and dynamic allocation In this way, during operation each of the transport controller 200 and main processor 700 are able to communicate with the shared data memory 400 without any loss of data.

As will be understood, the described scheme for access to a stored memory may be extended to any number of processors greater than two.

Figure 5:
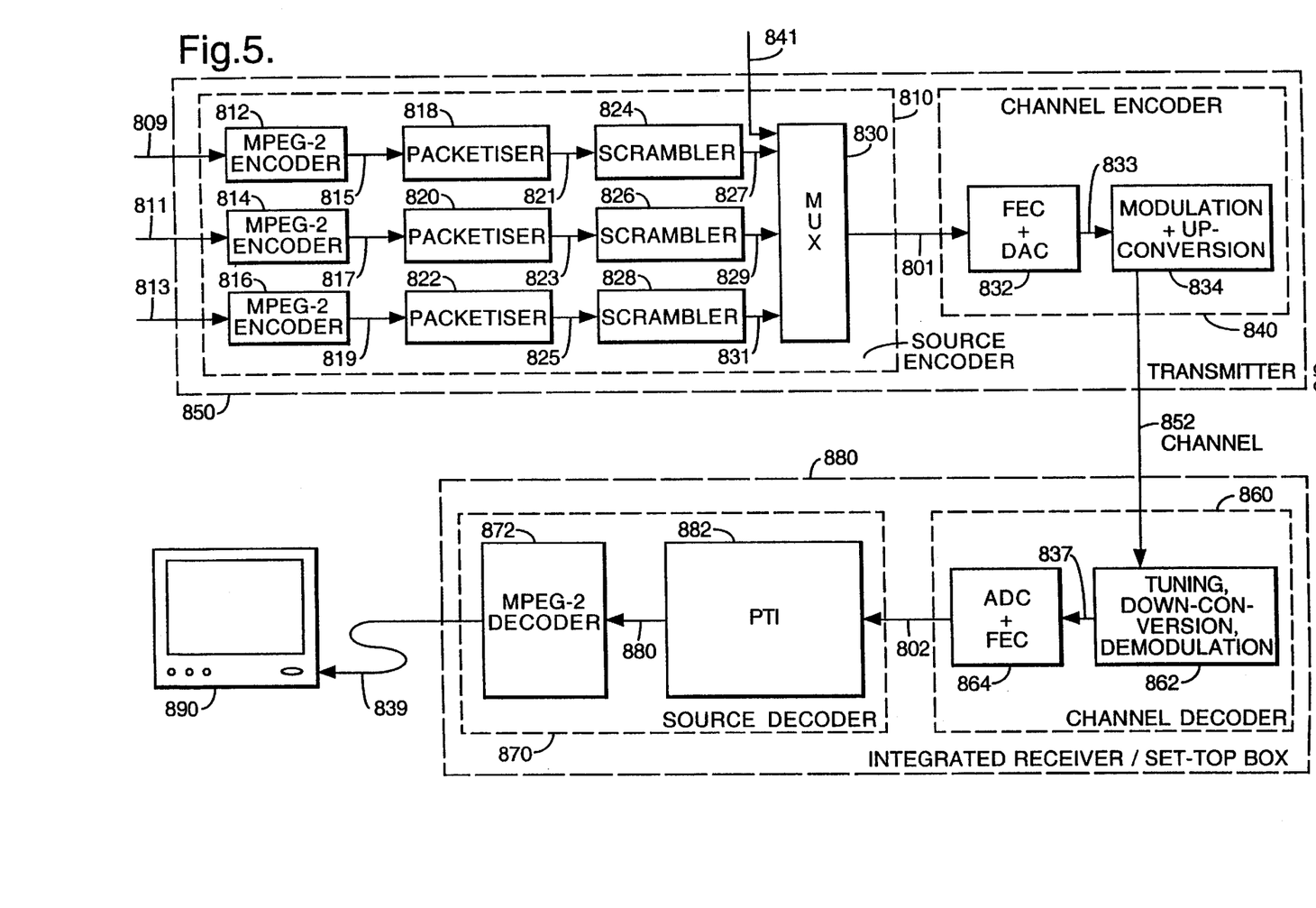
FIG. 5 illustrates a digital broadcast system incorporating a programmable transport interface according to the present invention.

FIG. 5 illustrates an application of a programmable transport interface, according to the present invention, in a digital television system.

FIG. 5 illustrates how digital television signals 809, 811, and 813 can be transmitted via a cable, satellite or terrestrial television channel 852 and be viewed on a television 890. The first, second and third television signals 809, 811 and 813 each represent the audio and video signals necessary to recreate a television program on input to a television. The digital television signals 809, 811 and 813 are source encoded and channel encoded by a transmitter 850 to produce a modulated analogue signal for transmission on the channel 852. An integrated receiver decoder (also known as a set-top-box) 880 receives the modulated analogue signal from the channel 852 and produces a video signal 839 which operates the television 890.

The operation of the transmitter 850 will now be explained. The transmitter includes a source encoder 810 and a channel encoder 840. The source encoder includes first, second and third MPEG-2 encoders 812, 814 and 816; first second and third packetisers 818, 820 and 822; first, second and third scramblers 824, 826 and 828 and a multiplexer 830. The first, second and third MPEG-2 encoders respectively receive the first 809, second 811 and third 813 television signals and encode the signals to produce first, second and third elementary bit streams 815, 817 and 819. The first 818, second 820 and third 822 packetisers respectively receive the first 815, second 817 and third 819 elementary bit streams and packetise the elementary bit streams to produce first, second and third packetised elementary bit streams (PES) 821, 823 and 825. The packetising of an elementary bit stream includes creating a series of packets which contain a packet header and a data portion, but which do not have any fixed length. The first 824, second 826 and third 828 scramblers receive respectively the first 821, second 823 and third 825 packetised elementary bit streams (PES) and produce first, second, and third scrambled PES 827, 829 and 831. Each of the scramblers scrambles only the data portion of each packetised elementary bit stream it receives and does not scramble the packet header.

The multiplexer 830 receives as inputs packetised sections of tables on line 841, and the first, second and third scrambled PES 827, 829 and 831, and produces a transport stream from one of its inputs on line 801. The packetised sections of tables 841 contain information which allows the set-top-box 880 to effect source decoding and produce the video signals 839. The information is stored in a tabular format where each table contains a number of sections and each section is transmitted individually.

The multiplexer 830 produces a transport stream 801 such as that illustrated in FIG. 1 as discussed in detail hereinabove. The transport stream includes a number of transport packets 2 wherein each transport packet contains a transport packet header 4 and a transport packet payload 6. The transport packets have a fixed length. In the MPEG-2 digital video broadcast (DVB) standard the transport packet is 188 bytes in length. The transport packets are shorter in length than the packets in the packetised elementary stream (PES). Consequently, a packet from the first scrambled PES 827 will be spread over a number of transport packets and these transport packets will be multiplexed with transport packets derived from the packetised sections of tables 841 and the second and third scrambled PES 829, 831. The transport stream is then supplied on line 801 to the channel encoder 840 to produce the modulated analogue signal for transmission on the channel 852.

The channel encoder 840 includes circuitry 832 for forward error correcting (FEC) the transport stream on line 801 and a digital-to-analogue converter (DAC) for converting the signal from digital to analogue to produce an analogue signal 833. The analogue signal 833 is modulated and up-converted to a transmission frequency by the circuit 834 to produce the modulated analogue signal which is then transmitted into the channel 852.

The operation of the set-top-box 880 will now be explained. The set-top-box 880 includes a channel decoder 860 and a source decoder 870. The channel decoder 860 receives the modulated analogue signal on the channel 852 and produces the transport stream 802 which it supplies to the source decoder 870.

The channel decoder 860 includes circuitry 862 for tuning to the modulated analogue signal on the channel 852, and for down-converting and demodulating the modulated analogue signal on the channel 852 to produce an analogue signal 837. The analogue signal 837 is converted from analogue to digital in an analogue to digital converter (ADC) and forward error corrected (FEC) by the circuitry 864 to reproduce the transport stream as signal 802.

The source decoder 870 receives the transport stream 801 and produces the video signal 839. The source decoder 870 includes a programmable transport interface (PTI) 882 and MPEG-2 decoder 872. The PTI 960 demultiplexes the transport stream 802, selects the transport packets 2 carrying information relating to a particular television program, and descrambles these selected transport packets to produce a data output stream 880, which is, in fact, the packetised elementary bit stream associated with the selected television program. The MPEG-2 decoder 872 receives the data output stream 880 and produces the video signal 839 which is supplied to the television 890. The television 890 displays the selected television program.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of controlling accesses to a shared memory arranged to store blocks of data by first and second memory access circuitry, said first and second memory access circuitry having different word length, comprising the steps of:
   arbitrating between memory accesses by different ones of said first and second memory access circuitry, wherein the step of arbitrating includes pairing of first and second memory locations in response to a memory access from the second memory access circuitry;
   accessing a block of data responsive to each first memory access by said first memory access circuitry;
   accessing two blocks of data responsive to each memory access by said second memory access circuitry, wherein each memory write access by said second memory access circuitry comprises:
      reading blocks of data from said paired first and second memory locations; and
      writing blocks of data to said paired first and second memory locations.

2. The method of claim 1 wherein in said memory write access by said second memory access circuitry, only the contents of one of said first and second memory locations is changed.

3. The method of claim 1 wherein each memory read access by said second memory access circuitry comprises reading blocks of data from first and second memory locations.

4. The method of claim 1 wherein each memory write access by said first memory access circuitry comprises writing a block of data to one of a first or second memory location and writing a block of data to one of the other of the first or second memory location.

5. The method of claim 1 wherein each memory read access by said first memory access circuitry comprises reading a block of data from one of a first or second memory location.

6. The method of claim 2 wherein the contents of the other of the first and second memory locations are written to by the contents read therefrom.

7. The method of claim 1 further comprising the step of configuring memory locations into pairs each having a first and second memory location.

8. The method of claim 7 in which a memory access by said second memory access circuitry to either the first or second memory location additionally accesses the other of the first and second memory locations.

9. The method of claim 1 in which the arbitrating step includes granting access to said second memory access circuitry responsive to simultaneous requests by said first memory access circuitry and said second memory access circuitry.

10. The method of claim 1 wherein the first and second memory locations are adjacent.

11. The method of claim 1, wherein said memory has a word length equal to one of said first and second memory access circuitry.

12. Circuitry for accessing a memory in which data is stored as blocks, comprising:
   arbitration circuitry for controlling access to the memory, wherein the arbitration circuitry includes pairing circuitry to pair first and second memory locations;
   first memory access circuitry connected to the arbitration circuitry for accessing a stored data block said first memory access circuitry having a first word length; and
   second memory access circuitry connected to the arbitration circuitry for accessing two stored data blocks, said second memory access circuitry having a second, different word length wherein on a write access the second memory access circuitry reads two data blocks from first and second memory locations and writes two data blocks to the first and second memory locations.

13. Circuitry according to claim 12 in which on a write access the contents of only one of the first and second memory locations is changed.

14. Circuitry according to claim 12 in which on a read access the second memory access circuitry reads the contents of first and second memory locations.

15. Circuitry according to claim 12 wherein on a write access the first memory access circuitry writes a data block to a first memory location and writes a memory data block to a second memory location.

16. Circuitry according to claim 13 in which the contents of the other of the first and second memory locations is written to by the contents read therefrom.

17. Circuitry according to claim 12 in which the arbitration circuitry configures the memory as pairs of first and second memory locations.

18. Circuitry according to claim 12 in which the arbitration circuitry provides priority to access by the first memory access circuitry.

19. A set-top-box receiver including circuitry for accessing a memory in which data is stored as blocks, said circuitry comprising:
   arbitration circuitry for controlling access to the memory, the arbitration circuitry including circuitry to pair first and second memory locations;
   first memory access circuitry connected to the arbitration circuitry for accessing a stored data block said first memory access circuitry having a first word length; and
   second memory access circuitry connected to the arbitration circuitry for accessing two stored data blocks, second memory access circuitry having a second, different word length, wherein on a write access the second memory access circuitry reads two data blocks from first and second memory locations and writes two data blocks, to the first and second memory locations.

* * * * *